US012652429B2

(12) United States Patent
Lin

(10) Patent No.: US 12,652,429 B2
(45) Date of Patent: Jun. 9, 2026

(54) METHOD FOR SWITCHING CONTROL COMMANDS ACROSS PLATFORMS AND SMART DEVICE

(71) Applicant: REALTEK SEMICONDUCTOR CORP., Hsinchu (TW)

(72) Inventor: Yi-Wen Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 60 days.

(21) Appl. No.: 18/675,286

(22) Filed: May 28, 2024

(65) Prior Publication Data

US 2024/0406482 A1 Dec. 5, 2024

(30) Foreign Application Priority Data

Jun. 1, 2023 (TW) ................................. 112120428

(51) Int. Cl.
| | |
|---|---|
| *H04N 21/422* | (2011.01) |
| *G06F 3/14* | (2006.01) |
| *H04N 21/431* | (2011.01) |
| *H04N 21/436* | (2011.01) |
| *H04N 21/462* | (2011.01) |
| *H04N 21/482* | (2011.01) |

(52) U.S. Cl.
CPC ..... *H04N 21/42204* (2013.01); *G06F 3/1454* (2013.01); *H04N 21/431* (2013.01); *H04N 21/436* (2013.01); *H04N 21/4622* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 2003/0229900 A1* | 12/2003 | Reisman .............. | H04N 21/422 |
| | | | 348/E7.071 |
| 2009/0140905 A1* | 6/2009 | Lemmers ............ | H04L 12/2818 |
| | | | 341/176 |

FOREIGN PATENT DOCUMENTS

| | | |
|---|---|---|
| TW | 201537529 A | 10/2015 |
| TW | 201931175 A | 8/2019 |

* cited by examiner

*Primary Examiner* — James R Marandi
(74) *Attorney, Agent, or Firm* — Li & Cai Intellectual Property (USA) Office

(57) ABSTRACT

A method for switching control commands across platforms and a smart device are provided. The smart device, such as a smart screen, connects with a data source by a communication circuitry, displays content received from the data source by a display screen, and includes an input circuitry that provides an input interface circuitry for allowing a control device to connect with the smart device. When an operating system of the smart device receives a command for launching a menu interface from the control device, the menu interface that provides an option of at least one data source is activated. When the data source is selected, the content received from the data source is displayed on the display screen. In the meantime, a signal channel is established between the smart device and the data source in order to forward commands generated by the control device to the data source.

13 Claims, 5 Drawing Sheets

40

401

403

40

402

Home
TV
Netflix
Youtube
AirPlay
Miracast

400

403

METHOD FOR SWITCHING CONTROL COMMANDS ACROSS PLATFORMS AND SMART DEVICE

CROSS-REFERENCE TO RELATED PATENT APPLICATION

This application claims the benefit of priority to Taiwan Patent Application No. 112120428, filed on Jun. 1, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology of switching control commands among devices, and more particularly to a method for switching control commands across platforms and a smart device that applies the method.

BACKGROUND OF THE DISCLOSURE

A smart device can be defined as a smart screen capable of processing images, displaying images, controlling input/output, and networking. An operating system operated in the smart device can be, for example, the Android™ OS that provides an input interface for connecting with a control device (e.g., a remote control, a keyboard, or a computer mouse) by a wired connection or a wireless connection. The operating system allows a user to control the smart device via the control device. The smart device includes a communication interface such as a universal serial bus (USB), HDMI™, or a DisplayPort (DP). The smart device is further equipped with a wireless communication technology for connecting with other external devices (e.g., an audiovisual device or a computer device), and can be used to receive audiovisual data from an external source.

However, in the conventional technologies, the control device connected with the smart device is driven by a driver executed in the operating system of the smart device, and the control device can only be used to control the smart device but not the other external devices connected with the smart device.

On the other hand, through the operating system operated in the smart device, the smart device provides a user interface that provides options of multiple audiovisual sources. The options include a television channel (TV), HDMI™, USB, DP, or other available wireless communication protocols (such as Airplay™ and Miracast™). Based on selection, the smart device displays pictures received from any one of the communication interfaces. However, the control device connected with the smart device does not yet have a method to switch from the smart device and manipulate the picture shown on a display and provided by the connected external device.

SUMMARY OF THE DISCLOSURE

In response to the above-referenced technical inadequacy, for achieving a purpose of allowing a control device that is only connected with a smart device to control another device, the present disclosure provides a method for switching control commands across platforms and a smart device that applies the method. In the method, a user interface program is executed for switching input data sources. In the meantime, a signal channel is established and provided for the control device that is originally connected with the smart device to control a content received from another data source.

In addition to a processing circuit used to process image data, the main components of the smart device include one or more communication circuitries that provide a communication interface circuit for connecting with the data source, a display screen used to display a content received from the data source, and an input circuitry that provides an input interface circuitry for allowing the control device to connect with the smart device. The control device can be a remote control, a computer mouse, or a keyboard that is used to control the smart device.

An operating system is operated in the smart device. The method is performed in the operating system. The method includes receiving a command for launching a menu interface by the control device, launching the menu interface that provides options of one or more data sources (e.g., a television channel, a streaming video source, or a mirroring source), receiving a content from the selected data source, and displaying the content on the display screen. In the meantime, the signal channel is established between the smart device and the data source. The commands generated by the control device can be forwarded to the data source via the signal channel.

Preferably, the data source is an external device. The content displayed by the external device can be displayed on the display screen of the smart device via the communication interface circuit of the smart device. The content displayed on the external device is mirrored on the display screen of the smart device via the communication interface circuit by a wireless audiovisual transmission technology.

Further, when the external device mirrors pictures to be displayed on the smart device, the signal channel is established between an operating system of the external device and the operating system of the smart device.

A driver of the control device is executed in the smart device, and the driver is used to drive operations of the control device and interpret the commands generated by the control device.

Furthermore, in the method for switching control commands across platforms, the control device that is originally used to control the smart device is enabled to control the data source via the signal channel for displaying the content displayed on the display screen when the signal channel is activated; and the command generated by the control device is only used to control the smart device when the signal channel is deactivated.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
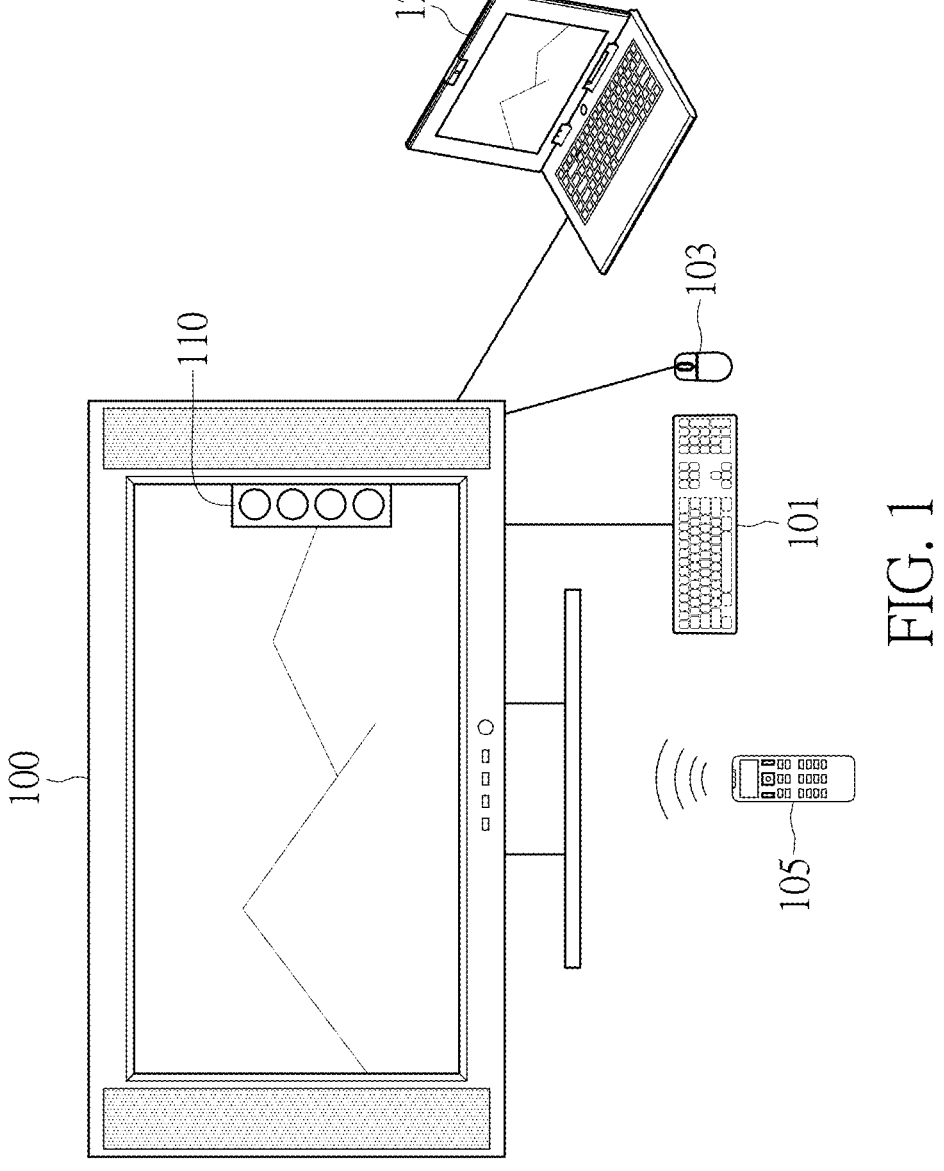
FIG. 1 is a schematic diagram illustrating a smart device that embodies a method for switching control commands across platforms and its peripheral devices according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure relates to a method for switching control commands across platforms and a smart device that applies the method. More particularly, a smart device having a display is provided, and the display can be a smart screen that is capable of processing audio and video. The smart screen generally has functions of processing audio and video, displaying images, controlling output and output, and networking. An operating system is operated in the smart screen for providing various audio-video programs (e.g., a video-streaming program) and performing a user interface program that provides a menu. The provided menu allows a user to select one of data sources. By the user interface program, a content displayed on the smart device can be switched to be a content received from the data source.

In addition to processing circuits that are used for processing image data and network data, the smart device includes one or more wired or wireless communication interface circuits that are used to connect with the data source. The data source can be an external device, such as a computer device or a mobile device. Apart from having the function of displaying television channels of the smart device, the smart device also allows the external device to mirror a displayed content on the smart device. For example, the displayed content of the external device can be mirrored on a display screen of the smart device via a specific audiovisual connection port that can be implemented by USB, HDMI, AVI, DVI or DP, or via a wireless audiovisual transmission technology (such as Miracast, Chromecast™ or Airplay™). The audiovisual content is transmitted to the smart device by the wireless audiovisual transmission technology. For example, Miracast adopts a WIFI direct connection to implement a wireless HDMI protocol. The above-mentioned data source can also be an audiovisual application executed in an operating system of the smart device. The audiovisual application can be a video-streaming program, such as Netflix™ or YouTube™. The content displayed on the smart device can be switched to the content broadcasted by the audiovisual application.

More particularly, the control device, such as a remote control, a keyboard, or a computer mouse, is connected with the smart device in a wire or wireless manner via an input interface circuitry of the smart device. The control device is operated by a driver executed in an operating system of the smart device, so that the user can input content into the smart device or control the smart device by the control device. One of the objectives of the method for switching the control commands across platforms and the smart device of the present disclosure is to provide a user interface, in which the user interface allows functions of the control device to be shared across the smart device for the external device connected with the smart device. Therefore, the user only needs to use the computer mouse, the keyboard, or the remote control for switch controlling the smart device or the external device across platforms.

FIG. 1 is a schematic diagram illustrating a smart device that embodies a method for switching control commands across platforms and its peripheral devices according to one embodiment of the present disclosure.

A smart device 100 that can be a smart TV or a smart display capable of data processing and communicating is shown in the diagram. The smart device 100 has a display screen for displaying TV contents, audiovisual contents of an internal audiovisual application (such as the Netflix™ or YouTube™ program) that are received by a video-streaming technology, or the contents that are mirrored from an external device 12. The smart device includes a communication interface circuit capable of transmitting video and audio signals. The communication interface for the communication interface circuit is, for example, a universal serial bus (USB), a high-definition multimedia interface (HDMI), or a DisplayPort (DP). The communication interface is provided for the external device to connect with the smart device via a corresponding audiovisual connection port, and the smart device can be used to display the content that is originally displayed on the external device by a mirroring method, or to receive audiovisual data provided by the external device and display the audiovisual data on a display of the smart device.

The smart device 100 connects with one or more control devices in a wireless or wired manner. The control device can be a keyboard 101, a computer mouse 103, or a remote control 105. In general, the control device is used to control operations of the smart device 100. When the external device 12 is connected with the smart device 100 in a wired or wireless manner, the external device 12 transmits the audiovisual data to the smart device 100 via a specific communication interface circuit. The smart device 100 can display the content from a data source (e.g., the external device 12) on its display screen by the mirroring method.

The user generally uses the control device (101, 103 or, 105) to control the smart device 100, and the user can manipulate the picture mirrored on the external device 12 by transmitting the control commands to an operating system operated in the external device 12. For example, the user can manipulate the control device to generate the control commands, so as to control a volume, set the picture displayed on the external device, start playing, fast-forward play, fast-backward play, pause and stop playing the audiovisual content, or switch to another audiovisual content when a signal channel is established between the operating system of the smart device 100 and the operating system of the external device 12. In this way, the control commands can be transmitted to the operating system of the external device 12.

According to one embodiment of the method for switching the control commands across platforms, a user interface program is installed in the operating system of the smart device 100 for initiating a menu interface 110 on the smart device 100, so that the menu interface 110 acts as a user interface for switching the control commands across platforms of the smart device 100 and the external device 12. In the beginning, the user can manipulate the control device to control the smart device 100. For example, in order to mirror pictures to be displayed on the external device 12, the menu interface 110 is launched by a preset command, and the command to launch the menu interface 110 can be configured to be a key code of a middle key of the computer mouse 103. When the operating system of the smart device 100 receives the key code of the middle key of the computer mouse 103, the menu interface 110 is launched. On the menu interface 110, options of many data sources, such as television channels, at least one source of streaming audiovisual content, and at least one mirroring source, are provided. The user can select one of the data sources by the control device and switch controls to the external device 12.

Figure 2:
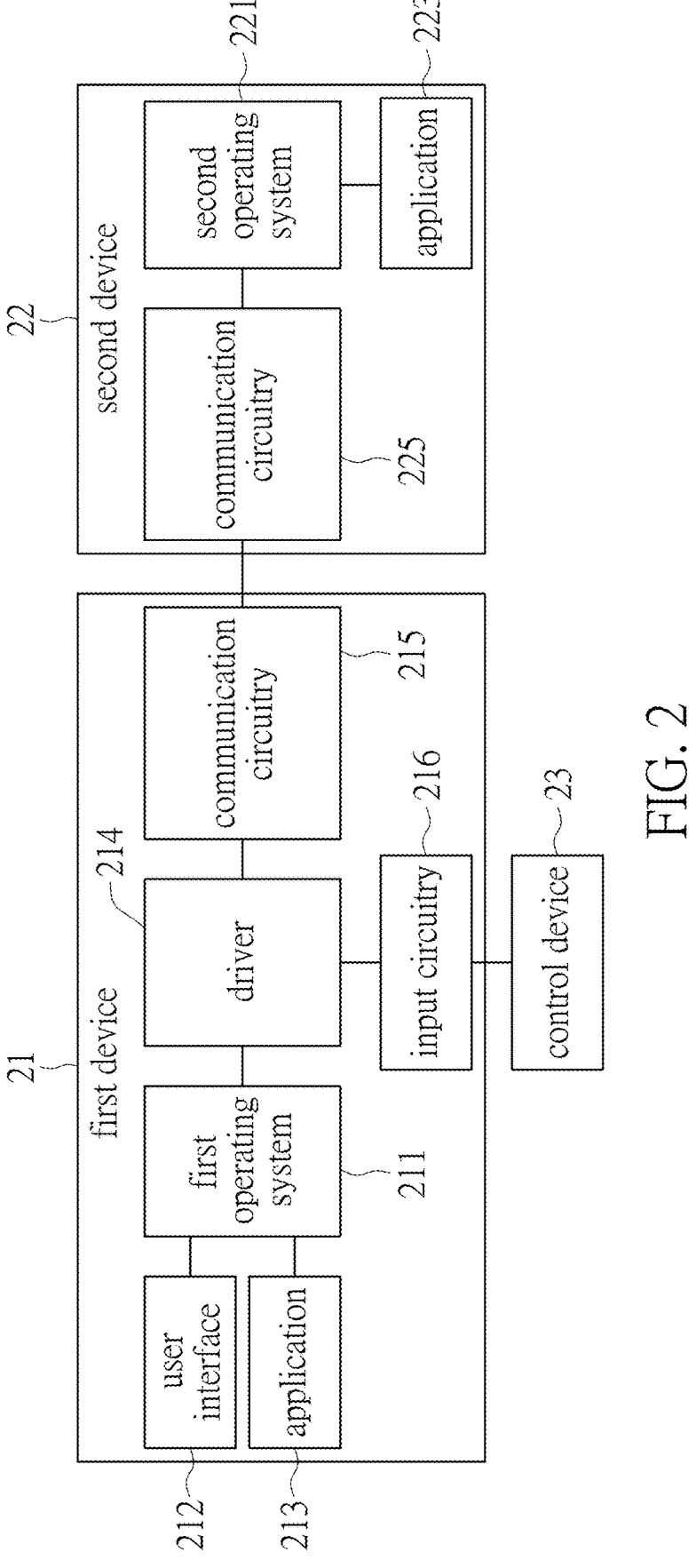
FIG. 2 is a functional block diagram illustrating the smart device that embodies the method for switching the control commands across platforms and its peripheral devices according to one embodiment of the present disclosure.

Further reference is made to FIG. 2, which is a schematic diagram illustrating functional blocks of the intelligent device and the device connected thereto that collaboratively perform the method for switching control commands across platforms according to one embodiment of the present disclosure. In the diagram, a plurality of functional modules (that can be software-implemented modules or functional modules collaboratively implemented by software and hardware) in the smart device (represented by a first device 21) and one or more external devices (represented by a second device 22) are required for achieving the method of the present disclosure.

The first device 21 is, for example, a smart device capable of data processing and communication, and includes a processor, a memory, and a communication circuit (not shown in the diagram). A first operating system 211 is operated in the first device 21 for providing services of a user interface 212, an application 213, and a driver 214 by software. The user interface 212 provides a menu having options of multiple data sources, the application 213 can be a TV program player or a specific video-streaming player, and the driver 214 is used to drive the control device 23 to operate for interpreting signals and commands generated by the control device 23. The driver 214 is also used to switch the control commands across different platforms.

The first device 21 further includes a communication circuitry 215 and an input circuitry 216. The communication circuitry 215 includes a communication interface circuit and a communication circuit used to process communication protocols and data. The first device 21 is connected with at least one data source in a wireless or wired manner via the communication interface circuit. The data source can be a specific video-streaming platform or the external device shown in the diagram. The input circuitry 216 includes a wired or wireless interface used to connect with various control devices 23 and a circuit used to process input signals.

The first device 21 includes the control device 23 that is an input device (e.g., a remote control, a computer mouse, or a keyboard). The first device 21 can also be configured with multiple control devices. The control device 23 is connected with the first device 21 in a wireless or wired manner for controlling operations of the first device 21. For example, when a TV program is played, the control device 23 is used for volume adjustment, screen setting, and channel switching. If a specific audiovisual file is played, the control device 23 can be used to control the various functions for playing said file. Furthermore, through the menu interface shown in FIG. 1, the user can manipulate the control device 23 to select one of the data sources, so as to switch controls to the display screen of the first device 21 when mirroring the content of the second device 22 to the first device 21. A signal channel is established between the first device 21 and the second device 22, so that the control device 23 connected with the first device 21 can successfully control the audiovisual content played by the second device 22.

The second device 22 connects with the first device 21 in a wireless or wired manner via a communication circuitry 225. The second device 22 is generally a computer device with data processing and communication capabilities. A second operating system 221 is operated in the second device 22 for performing an application 223, such as an audiovisual program, a presentation program, or any other application that is required to mirror pictures to the first device 21.

In order to transfer the commands generated by the control device 23 that is originally used to control the first device 21 (which refers to the smart device having the display screen) to the second device 22 (which refers to the data source, such as the external device), the signal channel is established between the first operating system 211 operated in the first device 21 and the second operating system 221 operated in the second device 22 for achieving the purpose of switching the control commands across different platforms. The commands or signals transmitted via the signal channel are in a specific encoding method and can be interpreted by both the operation systems (211, 221) of the two devices (21, 22) under a specific communication protocol. One of the objectives of the signal channel is to allow the control commands originally used to control the first device 21 to control the content of the second device 22 to be mirrored to the first device 21 via the specific communication protocol. The control commands are transferred to the application of the second device 22, so as to control the content to be displayed.

In an exemplary example, the user originally manipulates the control device 23 to control the first device 21. Afterwards, the signal channel is established between the first device 21 and the second device 22 for transferring the control commands generated by the control device 23 to the second operating system 221 of the second device 22, and the second operating system 221 is able to process the control commands for generating further commands to control the content to be mirrored to the first device 21.

Figure 3:
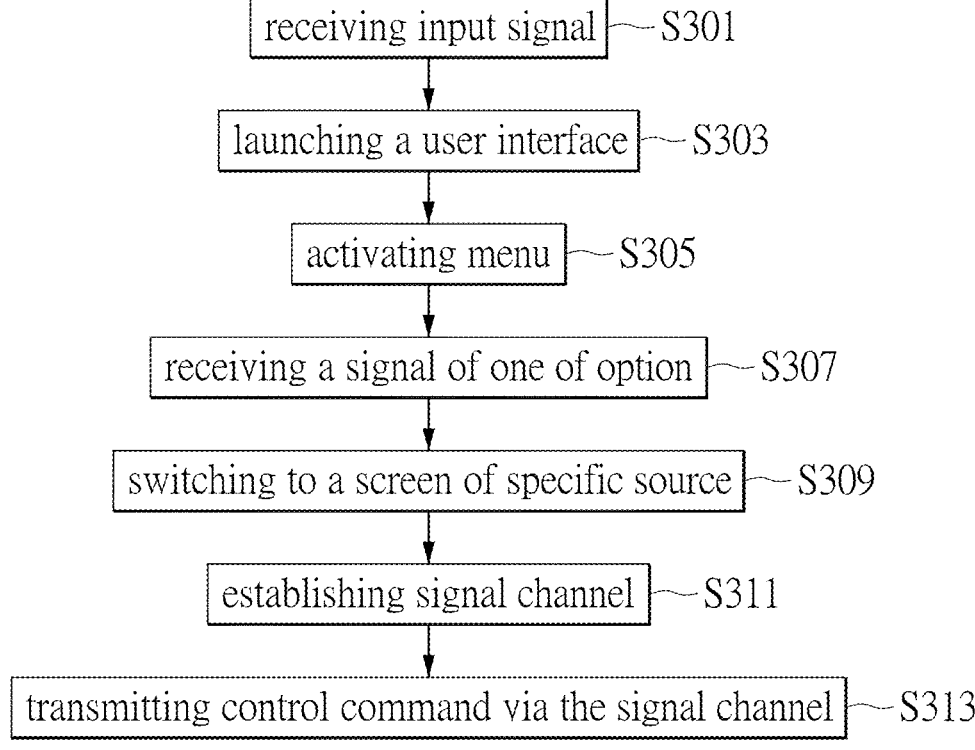
FIG. 3 is a flowchart illustrating the method for switching the control commands across platforms according to one embodiment of the present disclosure.

Reference is made to FIG. 3, which is a flowchart illustrating the method for switching the control commands across platforms according to one embodiment of the present disclosure.

Before the method is performed, relevant system configuration is as shown in the embodiment of FIG. 2, in which the control device connects with the first device 21, and the first device 21 operates the first operating system 211. The driver 214 operated in the first operating system 211 is used to drive the control device 23. The user interface 212 is then initiated in a software implementation and displayed on the display screen of the first device 21. The user interface 212 embodies a display interface used to display pictures and also a menu interface that provides options of data sources. The menu interface provides at least one option of data source, and in practice, options of multiple data sources. The application 213 executed in the first operating system 211 can be a TV program player or a video-streaming player. The first device 21 connects with the second device 22 in a wireless or wired manner. The second operating system 221 operated in the second device 22 includes the application 223, such as an audiovisual player, a presentation program, or the like. The pictures generated when the application 223 is performed can be mirrored to the display screen of the first device 21.

Figure 4A:
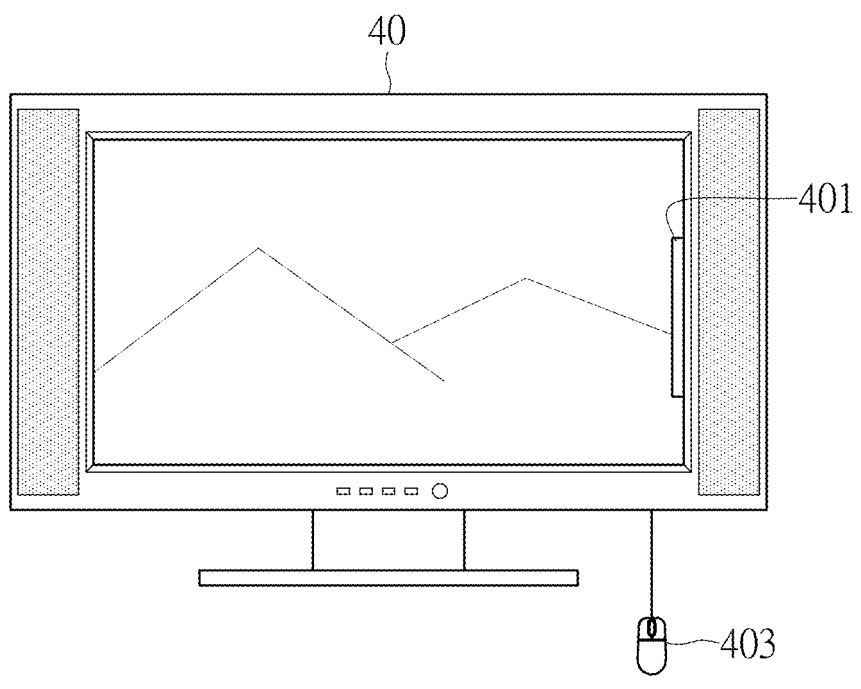
FIG. 4A to FIG. 4C are each a schematic diagram illustrating use of a user interface to implement the method for switching the control commands across platforms according to one embodiment of the present disclosure.
Figure 4B:
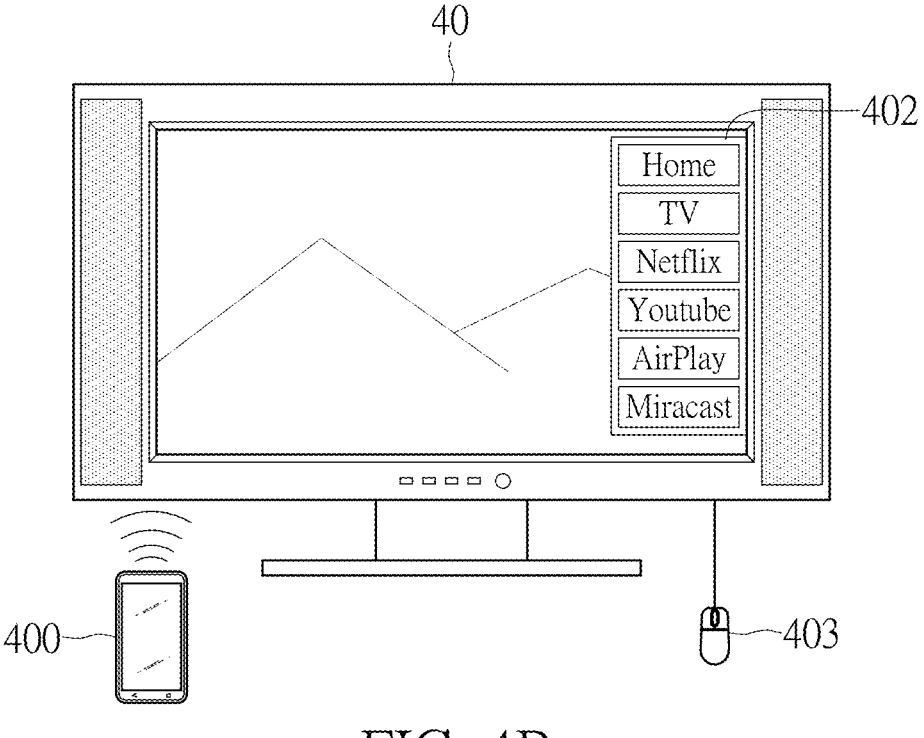
Figure 4C:
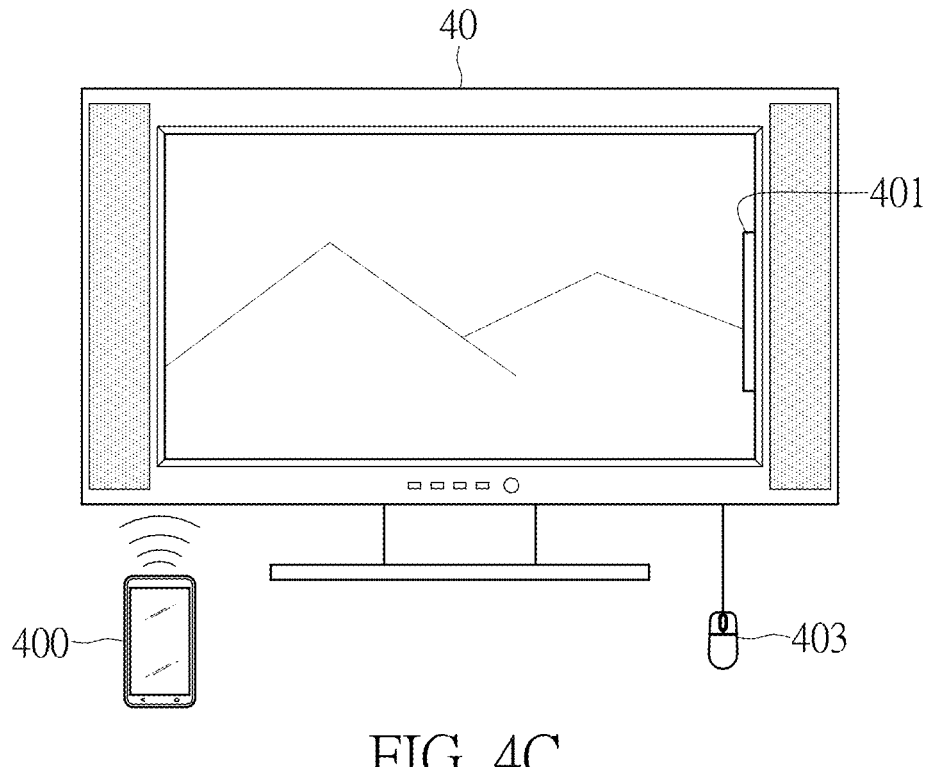

The following description of the flowchart of FIG. 3 can be read in conjunction with FIG. 4A to FIG. 4C, which are each a schematic diagram illustrating use of a user interface to implement the method for switching the control commands across platforms according to one embodiment of the present disclosure.

FIG. 4A is a schematic diagram depicting a smart device 40 that operates an operating system. The operating system provides a user interface for the user to view, e.g., a display interface and a menu interface. In addition to providing the option of at least one data source, a user interface program that operates the menu interface can be used to intercept the commands generated by the control device. The user interface program can also be performed to determine a channel for transferring a control command according to a selection that is made via the menu interface. The smart device 40 connects with a control device 403, so that the user is allowed to manipulate the control device 403 for controlling operations of the smart device 40. For example, when playing a content of a television channel, the control device 403 can be used to switch channels, control a volume, adjust display settings, etc. In particular, the smart device 40 can achieve the method for switching the control commands across platforms by a software implementation, firmware operated in a circuitry, or hardware.

The operating system operated in the smart device 40 sets up a command for launching a menu interface 401. For example, the command can be activated by a button disposed on a control device 403 for launching the menu interface 401. The button used to launch the menu interface 401 can be a middle key of a computer mouse, one of function buttons of a keyboard, a combination of keys (e.g., Alt+0), or one of buttons of a remote control. Furthermore, the command can be activated by moving a cursor of the computer mouse to a predetermined position of the display screen.

When the smart device 40 is playing content from a specific data source, the menu interface 401 can be hidden at a specific position by default for preventing affecting the displayed content. In the meantime, the user can select another data source by generating an input signal through the smart device 40 for switching to the data source. The input signal can be a key code generated by the control device. In step S301, the operating system of the smart device 40 receives the input signal. In step S303, a user interface is launched when the input signal is determined as the command for launching the user interface. In addition to the content to be displayed, a menu interface displaying at least one option of data source is launched (step S305). According to one embodiment shown in FIG. 4B, the hidden menu interface 401 is then shown as a pop-up menu interface 402.

The pop-up menu interface 402 provides options of multiple data sources. The pop-up menu interface 402 provides an option ("Home") to return to a home page providing several native functions of the operating system of the smart device 40, and another option ("TV") to play a TV program. The pop-up menu interface 402 also provides an option ("Netflix") to link to a first video-streaming player (e.g., the "Netflix™") and another option ("Youtube") to link to a second video-streaming player (e.g., "Youtube™"). The video-streaming players can be the applications installed in the operating system of the smart device 40. The pop-up menu interface 402 further provides an option ("AirPlay™") for performing a first mirroring function for an external device 400 and another option ("Miracast") for performing a second mirroring function. It should be noted that the smart device of the present disclosure is not limited to the configuration shown in the diagram.

Next, as shown in FIG. 4B, the user can manipulate the external device 400 to connect with the smart device 40 for mirroring the content of the external device 400 to the display screen of the smart device 40. When the user manipulates the control device 403 to select one of the data sources shown on the pop-up menu interface 402, an option signal is generated. The operating system of the smart device 40 then receives the option signal (step S307), and switches to pictures of the selected data source (step S309). As shown in FIG. 4C, the display screen of the smart device 40 displays the pictures mirrored by the external device 400. After the pictures are displayed on the smart device 40, the menu interface 402 is again hidden at a specific position of the display screen.

In the meantime, the operating system of the smart device 40 receives the option signal when switching to the selected data source that can be the external device 400, a signal channel to the data source is established. In one embodiment of the present disclosure, the signal channel is established between the operating system of the smart device 40 and the operating system of the external device (step S311). The control commands generated by the control device 403 can be transferred to the external device 400 via the signal channel (step S313). Afterwards, the control device 403 that is originally used to control the smart device 40 can be used to control the applications of the external device 400 via the signal channel.

According to one embodiment of the present disclosure, the data source can be the external device 400. The smart device 40 can display the content mirrored by the external device 400. On the other hand, the data source can be the application executed in the operating system of the smart device 40. Taking a video-streaming source as an example, the smart device 40 executes a video-streaming player for streaming the contents from the connected video-streaming source.

In should be noted that, in the method for switching the control commands across platforms, the signal channel used to transfer the control commands is established between two different platforms operated in two different devices. The user interface acts as a background routine for intercepting the control commands generated by the control device. When the signal channel between the two devices is established and activated, the commands can be transferred across different platforms via the signal channel. Conversely, when the signal channel is deactivated, there is no need to transfer the control commands across platforms. As shown in the embodiment of FIG. 2, the first device can be the smart device, and the second device can be the external device that is configured to mirror contents to the first device. The external device can be a desktop computer, a laptop computer, a mobile phone, or a tablet computer. When the second device mirrors the contents to the first device via a specific transmission technology such as Miracast, Chromecast or Airplay, the signal channel is immediately established for interconnecting the operating system of the first device and the operating system of the second device.

Furthermore, when the signal channel is activated, the control device that is originally used to control the smart device is enabled to control the data source to display the content displayed on the display screen via the signal channel. Conversely, when the signal channel is deactivated, the command generated by the control device is only used to control the smart device. It should be noted that the connection between the first device and the second device, the connection between the control device and the first device, and a communication protocol performed among the devices are not limited to any specific method.

In summation, according to the above embodiments of the method for switching the control commands across platforms and the smart device, the smart device can be a smart screen that is able to display the content provided by various data sources. For example, the method allows an external device to display the content on the smart screen. In the meantime, an operating system of the smart device performs the method. The smart device connects with one or more control devices that can be a remote control, a computer mouse, or a keyboard. When the smart device is controlled, a user interface can be used to select and to switch to one of the data sources, and also to control an external device through the method.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for switching control commands across platforms, which is performed in a smart device, the method comprising:
   receiving, by an operating system operated in the smart device, a command that is generated by a control device connected with the smart device for launching a menu interface;
   launching the menu interface that provides an option of at least one data source;
   displaying, on the smart device, a content received from the data source that is selected;

establishing a signal channel between the smart device and the selected data source;
transferring, via the signal channel, one or more further commands generated by the control device to the selected data source, so that the control device that is originally configured to control the smart device is switched to control the selected data source via the signal channel when the signal channel is activated; and
displaying the content received from the selected data source on a display screen of the smart device;
wherein, the one or more commands generated by the control device is only used for controlling the smart device when the signal channel between the smart device and the selected data source is deactivated.

2. The method according to claim 1, wherein a user interface program operating the menu interface is used to provide the option of the at least one data source and to intercept the one or more commands generated by the control device.

3. The method according to claim 1, wherein the data source is an external device, and the content displayed on the external device is mirrored on a display screen of the smart device via a communication interface circuit of the smart device.

4. The method according to claim 3, wherein the signal channel is established between the operating system of the smart device and an operating system operated in the external device, and the signal channel is provided for transmitting commands or signals that are to be interpreted by both the operating systems operated in the smart device and the external device.

5. The method according to claim 1, wherein the operating system executes a driver of the control device for driving operations of the control device and interpreting the commands generated by the control device.

6. The method according to claim 5, wherein, when the data source receives one of the commands generated by the control device via the signal channel, the data source is controlled by the command for controlling the content displayed on the smart device.

7. A smart device, comprising:
   one or more communication circuitries that connect with a data source via a communication interface circuit;
   a display screen for displaying a content received from the data source;
   an input circuitry, providing an input interface circuitry that allows a control device to connect with the smart device;
   wherein the smart device operates an operating system that performs the steps for switching control commands across platforms that include:
      receiving a command generated by the control device for launching a menu interface;
      launching the menu interface that provides an option of at least one data source;
      displaying a content received from the selected data source on the display screen;
      establishing a signal channel between the smart device and the selected data source;
      transferring, via the signal channel, one or more further commands generated by the control device to the selected data source, so that the control device that is originally configured to control the smart device is switched to control the selected data source via the signal channel when the signal channel is activated; and displaying the content received from the selected data
source on the display screen;

wherein, the one or more commands generated by the
control device is only used for controlling the smart
device when the signal channel between the smart
device and the selected data source is deactivated.

8. The smart device according to claim 7, wherein the data
source is an external device, and the content displayed on the
external device is mirrored on the display screen of the smart
device via the communication interface circuit of the smart
device.

9. The smart device according to claim 8, wherein the
external device mirrors pictures onto the display screen of
the smart device via the communication interface circuit by
a wireless audiovisual transmission technology.

10. The smart device according to claim 8, wherein, when
the external device mirrors pictures to the smart device, the
signal channel is established between an operating system of
the external device and the operating system operated in the
smart device.

11. The smart device according to claim 7, wherein the
operating system executes a driver of the control device for
driving operations of the control device and interpreting the
commands generated by the control device.

12. The smart device according to claim 11, wherein the
control device is a remote control, a computer mouse, or a
keyboard that is configured to control the smart device.

13. The smart device according to claim 7, wherein the
smart device provides a plurality of options of the data
sources through the menu interface, and the options include
a television channel, at least one streaming video source, and
at least one mirroring source.

* * * * *